United States Patent [19]

Sugimoto et al.

[11] 3,904,837

[45] Sept. 9, 1975

[54] MAGNETIC PICKUP CARTRIDGE

[75] Inventors: Toshitaka Sugimoto; Norihiko Takami; Osamu Hattori, all of Toyokawa, Japan

[73] Assignee: Hitachi, Ltd., Japan

[22] Filed: Oct. 19, 1972

[21] Appl. No.: 298,868

[52] U.S. Cl. .............. 179/100.41 K; 179/100.41 M

[51] Int. Cl.² .......................................... H04R 11/12

[58] Field of Search ......... 179/100.41 K, 100.41 M, 179/100.41 Z; 274/37

[56] References Cited

UNITED STATES PATENTS

| | | | |
|---|---|---|---|
| 3,294,405 | 12/1963 | Pritchard | 179/100.41 K |
| 3,297,831 | 1/1967 | Stanton | 179/100.41 K |
| 3,576,955 | 5/1971 | Obata | 179/100.41 M |
| 3,576,956 | 5/1971 | Lanooy | 179/100.41 K |
| 3,761,647 | 9/1973 | Nemoto et al. | 179/100.41 K |

*Primary Examiner*—Daryl W. Cook
*Assistant Examiner*—David K. Moore
*Attorney, Agent, or Firm*—Craig & Antonelli

[57] ABSTRACT

A magnetic pickup cartridge in which a disc-shaped magnet is mounted in coaxial relation on the rear end of a stylus arm having a stylus mounted on the front end thereof and is magnetized in the same direction as the axial direction of the stylus arm. This magnet is disposed in an air gap of a pair of magnetic circuits so that voltage can be induced in coils disposed in the magnetic circuits with the vibrations of the magnet. The stylus arm is pivotally supported at the rear end thereof by a pivot comprising a needle and a needle engaging member, and the magnet is pressed against a supporting member disposed on the side remote from the rear end of the stylus arm so that the magnet and stylus arm can vibrate around the pivot point by being supported by the pivot and supporting member to induce voltage in the coils.

22 Claims, 10 Drawing Figures

MAGNETIC PICKUP CARTRIDGE

BACKGROUND OF THE INVENTION

1. Field of the Invention

This invention relates to a magnetic phonograph pickup cartridge for reproducing a stereophonic signal from a stereophonic disk record.

2. Description of the Prior Art

Pickup cartridges used for the reproduction of audio signals from disk records must have flat frequency characteristics over the entire frequency range of from low to high audio frequencies and must deliver an output signal having minimized distortion. In pickup cartridges used for the reproduction of stereophonic signals from stereophonic disk records, it is necessary to prevent undesirable crosstalk between the L-signal and the R-signal.

Magnetic pickup cartridges presently widely used in this field include a moving magnet pickup cartridge in which a magnet is disposed in a magnetic circuit and a stylus arm is connected to this magnet so as to derive an output signal from coils disposed in the magnetic circuit with the vibrations of the magnet depending on the amplitude of sound recorded on the sound groove of a disk record. Such a moving magnet pickup cartridge is disclosed in, for example, U.S. Pat. No. 3,077,522. This pickup cartridge comprises a bar magnet mounted on the rear end of a stylus arm, a bearing of elastic material such as rubber holding this magnet, and a wire spring anchored at one end thereof to this magnet and at the other end thereof to a spade. During the reproduction of recordings from a record, the stylus arm vibrates depending on the amplitude of the sound recorded on the sound groove of the record and the magnet held by the bearing makes pivotal movement around the imaginary center of the bearing so as to induce voltage in coils disposed in the magnetic circuit.

An output signal substantially free from distortion can be derived from such a moving magnet pickup cartridge if the magnet could make the pivotal movement from a low audio frequency to a high audio frequency of the order of 30 KHz. However, in a high audio frequency range, the magnet tends to make unnecessary movements in addition to the pivotal movement. More precisely, a to-and-fro movement in the longitudinal direction of the magnet as well as a vertical movement of the magnet tends to occur due to the elasticity of the bearing holding the magnet and expansion and contraction of the wire spring. Further, the magnet tends to make a rotating movement around the connection point between the wire spring and the spade. This rotating movement and the to-and-fro and vertical movements are unnecessary movements, and these unnecessary movements are added to the normal movement of the magnet to render the vibrations of the magnet quite complex. The unnecessary movements of the magnet adversely affect the operation of the pickup cartridge reproducing a stereophonic signal, resulting in occurrence of crosstalk between the R-signal and the L-signal, distortion in the output signal, and so on.

Therefore, it is necessary to prevent the magnet in such a moving magnet pickup cartridge from making such unnecessary movements. The to-and-fro and vertical movements of the magnet may be prevented by employing a bearing having a higher degree of hardness. However, the use of a hard bearing is undesirable in that the normal pivotal movement of the magnet is obstructed resulting in a reduced trackability. Further, the unnecessary rotating movement of the magnet may be eliminated by removing the wire spring. However, the removal of the wire spring is also undesirable in that the to-and-fro movement of the magnet is further increased.

SUMMARY OF THE INVENTION

It is an object of the present invention to provide a pickup cartridge capable of producing a substantially distortion-free output signal.

Another object of the present invention is to provide a pickup cartridge capable of reducing crosstalk between the L-signal and the R-signal.

A further object of the present invention is to provide a pickup cartridge having an vibration system which does not make any unnecessary movements.

The present invention is featured by a pickup cartridge which comprises a stylus arm having a stylus mounted on the front end thereof, a disc-shaped magnet mounted on the rear end of said stylus arm in perpendicular relation to the axis of said stylus arm and magnetized in the same direction as the axial direction of said stylus arm, a pair of magnetic circuits having an air gap, each said magnetic circuit including a pair of pole pieces arranged so that one end of one of said pole pieces is disposed opposite to the corresponding end of the other said pole piece in said air gap, and a pair of series-connected coils associated with each of said magnetic circuits, said magnet being disposed to vibrate in said air gap for inducing voltage in said coils.

Further, the pickup cartridge according to the present invention comprises a pivot means including a needle and a needle engaging member for pivotally supporting the stylus arm at the rear end thereof. Furthermore, a supporting member of elastic material is disposed on the stylus arm in contact with the magnet and a stationary wall member is disposed on the stylus arm in contact with the supporting member. The magnet is pressed against the supporting member by the pivot means, and thus, the supporting member is firmly held between the stationary wall member and the magnet so that the magnet vibrates around the point of contact between the needle and the needle engaging member forming the pivot means thereby inducing voltage in the coils.

In the pickup cartridge according to the present invention, the vibration system is supported by a sufficiently rigid pivot means at a single point. Therefore, unnecessary oscillations do not occur and a substantially distortion-free signal can be derived. Further, undesirable crosstalk between the L-signal and the R-signal can be reduced to a minimum.

DESCRIPTION OF THE PREFERRED EMBODIMENTS

Figures 1, 2:
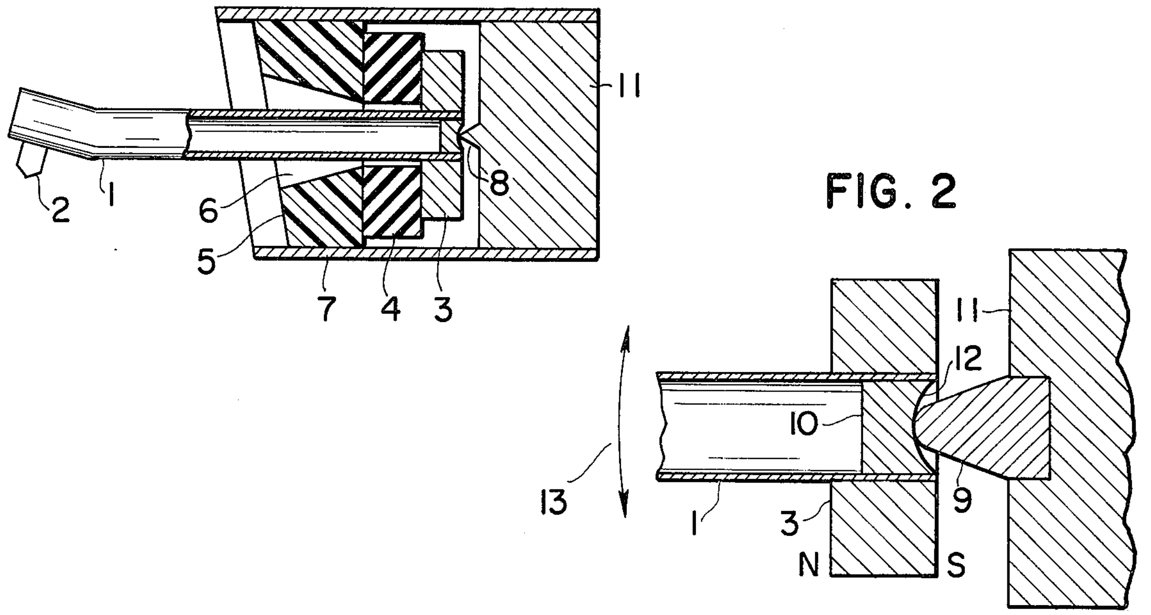
FIG. 1 is a schematic sectional view showing one form of the vibration system preferably employed in the present invention.
FIG. 2 is an enlarged detail view of the pivot portion of the vibration system shown in FIG. 1.

Referring to FIG. 1 showing an vibration system in a pickup cartrigde according to the present invention, a stylus 2 is mounted on one or front end of a stylus arm 1 and a magnet 3 in the form of a disc is mounted on the other or rear end of the stylus arm 1 in perpendicular relation to the axis of the stylus arm 1. The stylus 2 is made of a material such as diamond or sapphire. The stylus arm 1 is tubular in shape and the magnet 3 is provided with a central axial opening whose diameter is equal to the outer diameter of the stylus arm 1. The rear end of the stylus arm 1 is received in this central axial opening of the magnet 3 and the stylus arm 1 is bonded at its rear end to the magnet 3. A supporting member 4 in the form of a disc of elastic material such as rubber is disposed in front of the magnet 3. The supporting member 4 is provided with a central axial opening for receiving therein the corresponding portion of the stylus arm 1 as in the case of the magnet 3, but the diameter of the central axial opening of the supporting member 4 is larger than the outer diameter of the stylus arm 1 so that the stylus arm 1 may not be in contact with the supporting member 4. A stopper 5 of material such as a synthetic resin or metal is disposed in front of the supporting member 4 and is provided with a tapered central axial opening 6 whose smallest diameter is larger than the outer diameter of the stylus arm 1 so that the corresponding portion of the stylus arm 1 can extend through this tapered central axial opening 6 without contacting the stopper 5. The stopper 5 is secured at its outer peripheral surface to a tubular sleeve 7 of non-magnetic material by means such as an adhesive.

A pivot means 8 is disposed adjacent to the rear end of the stylus arm 1. As shown in FIG. 2, the pivot means 8 comprises a substantially conical needle 9 of hard material such as sapphire or diamond and a needle engaging member 10 disposed in the rear end opening of the stylus arm 1 and having a substantially conical recess 12. The needle 9 is embedded at the rear end thereof in a cylindrical needle holder 11 and is secured at such end to the needle holder 11 by bonding. The needle engaging member 10 is made of hard material such as sapphire or diamond and is securely fixed within the rear end opening of the stylus arm 1 as by bonding with an adhesive. The needle holder 11 is secured at its outer peripheral surface to the sleeve 7 as by bonding with an adhesive after placing the pointed front end of the needle 9 in the conical recess 12 of the needle engaging member 10 and imparting pressure to the needle holder 11 to force the magnet 3 forwardly until the magnet 3 bears against the supporting member 4. The magnet 3 is preferably made of a material such as barium ferrite or samarium cobalt. Further, the magnet 3 is magnetized in the same direction as the axial direction of the stylus arm 1, that is, in the axial direction thereof.

This vibration system is assembled by previously bonding the stopper 5 to the inner peripheral surface portion adjacent to the front end of the sleeve 7, inserting the stylus arm 1 having the supporting member 4 and magnet 3 mounted thereon into the sleeve 7 from the rear end opening of the sleeve 7, inserting the needle holder 11 into the sleeve 7 until the needle 9 is brought into contact with the needle engaging member 10 and the supporting member 4 engages both the stopper 5 and the magnet 3, imparting a pressure of, for example, 10 to 15 grams to the needle holder 11 for forcing the supporting member 4 against the stopper 5 by this pressure, and fixing the needle holder 11 to the sleeve 7 as by bonding under the above state. Therefore, a predetermined pressure is always imparted to the supporting member 4.

In such an vibration system, the stylus arm 1 vibrates depending on the amplitude of sound recorded on the sound groove when the stylus 2 traces the sound groove of a disk record. The vibrating stylus arm 1 makes a pivotal movement as shown by the arrow 13 in FIG. 2 around the point of contact between the needle 9 and the needle engaging member 10 forming the pivot means 8. When the stylus 2 traces the sound groove of the disk record, the stylus arm 1 is imparted with a force which urges the stylus arm 1 forwardly or in the left-hand direction in FIG. 1, and this force tends to cause unnecessary to-and-fro vibrations of the magnet 3 and stylus arm 1. However, the undesirable to-and-fro vibrations of the magnet 3 and stylus arm 1 can be suppressed due to the fact that the magnet 3 is urged against the supporting member 4 by the pivot means 8 with a predetermined pressure and the supporting member 4 possesses resiliency of a predetermined magnitude. Further, the stylus arm 1 is prevented from vertical vibrations in a direction perpendicular to the axial direction thereof due to the fact that a high contact pressure and a large vertical frictional force exist at the contact area between the needle 9 and the needle engaging member 10 forming the pivot means 8. Further, because of the fact that the needle 9 is rigid and is supported at one end thereof in the needle holder 11 at a wide area, the needle 9 itself is prevented from making any vibrations and any swinging movement of the needle 9 around the point of contact between it and the needle holder 11 does not occur. Therefore, the vibration system shown in FIG. 1 makes solely the normal pivotal movement around the pivot point of the pivot means 8 and is free from unnecessary vibrations. Thus, unnecessary resonance of the vibration system in a high frequency range can be suppressed and an improved trackability can be obtained over a wide range of from low to high frequencies thereby improving the separation of the L-channel and R-channel. The effect similar to that above described can be obtained by mounting the needle 9 on the stylus arm 1 and securing the needle engaging member 10 to the sleeve 7.

Figure 3:
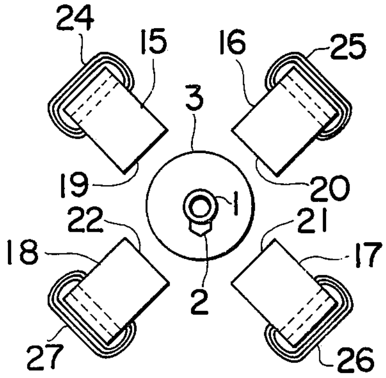
FIG. 3 is a schematic front elevation of parts of a pickup cartridge embodying the present invention.
Figure 4:
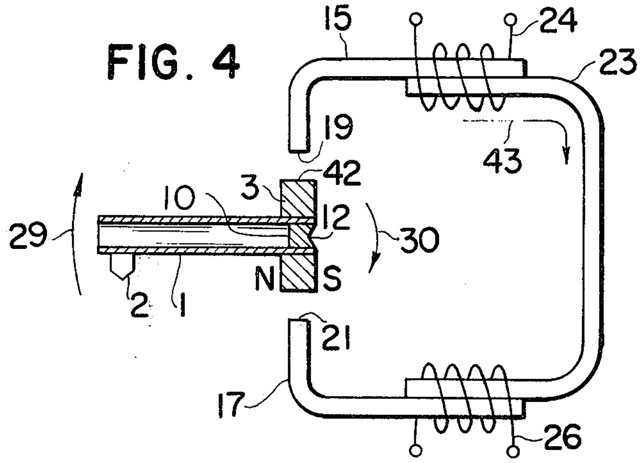
FIG. 4 is a schematic sectional view showing one form of the magnetic circuit arrangement in one channel of the pickup cartridge shown in FIG. 3.

FIG. 3 and 4 show a combination of a vibration system as shown in FIGS. 1 and 2 and a voltage generating system. In FIGS. 3 and 4, the elements including the pivot means 8, supporting member 4 and some others are not shown for convenience of illustration.

Referring to FIGS. 3 and 4, a stylus 2 is mounted on one or the front end of a stylus arm 1 which is a tubular member made of a material such as aluminum, and a magnet 3 in the form of a disc is mounted on the other or rear end of the stylus arm 1. The magnet 3 is provided with a central axial opening for receiving therein the rear end of the stylus arm 1. The magnet 3 is mounted on the stylus arm 1 in perpendicular relation to the axis of the stylus arm 1 and is magnetized in the same direction as the axial direction of the stylus arm 1. The magnet 3 is not necessarily in the form of a disc as illustrated and may be a plate in the form of a square or cross.

Four pole pieces 15, 16, 17 and 18 constitute a pair of magnetic circuits and are made of a material such as permalloy or iron. These pole pieces 15, 16, 17 and 18 are bent at one or front end portion thereof in the form of L and these ends 19, 20, 21 and 22 are opposite to each other in pairs through an air gap. The magnet 3 is disposed in this air gap and its outer peripheral surface 42 is opposite to the front ends 19, 20, 21 and 22 of the respective pole pieces 15, 16, 17 and 18. Further, the ends 19 and 21 of the pole pieces 15 and 17 forming one pair are parallel with each other, and the ends 20 and 22 of the pole pieces 16 and 18 forming the other pair are also parallel with each other, while the adjacent ones of these ends 19, 20, 21 and 22 are perpendicular to each other. Thus, these ends 19, 20, 21 and 22 are disposed at positions of point symmetry with respect to the central axis of the magnet 3. A generally U-shaped yoke 23 is coupled to the rear end portions of the pole pieces 15 and 17 for magnetically short-circuiting these pole pieces 15 and 17 with each other. Another generally U-shaped yoke 23 is also coupled to the rear end portions of the pole pieces 16 and 18 for magnetically short-circuiting these pole pieces 16 and 18 with each other. These yokes 23 are made of a material similar to that of the pole pieces 15, 16, 17 and 18. Coils 24, 25, 26 and 27 are wound around the four pole pieces 15, 16, 17 and 18 respectively. One magnetic circuit is formed by the two pole pieces 15 and 17 and the associated yoke 23. This magnetic circuit is basically in the form of C as seen in FIG. 4 due to the fact that the front ends 19 and 21 of the pole pieces 15 and 17 are opposite to the outer peripheral surface 42 of the magnet 3 through the air gap and these pole pieces 15 and 17 are short-circuited with each other by the yoke 23 at their rear end portions. The disc-shaped magnet 3 is disposed in the air gap defined between the front ends 19 and 21 of the pole pieces 15 and 17 to connect the discontinuous portions of the C-shaped magnetic circuit so that an O-shaped magnetic circuit is finally formed. A needle engaging member 10 forming a part of a pivot means 8 in FIG. 1 and having a conical recess 12 is securely fitted in the rear end opening of the stylus arm 1 and a needle (not shown) is brought into engagement with this conical recess 12 so that the stylus arm 1 can vibrate around the pivot point provided by the needle engaging the conical recess 12 of the needle engaging member 10 forming a part of the pivot means 8.

Consider now the play-back operation on one of the channels by such a pickup cartridge. When the stylus 2 moves upward as shown by the arrow 29 in FIG. 4 during the play-back of recordings on a disk record, the magnet 3 swings clockwise around the pivot point as shown by the arrow 30 with the result that the N pole of the magnet 3 approaches the pole piece 15 and the S pole approaches the pole piece 17. In this case, the lines of magnetic force emanating from the magnet 3 passes through the pole pieces 15 and 17 and yoke 23 in a direction shown by the arrow 43 thereby inducing a voltage of one polarity in the coils 24 and 26. When, on the other hand, the stylus 2 moves in a direction opposite to the direction shown by the arrow 29, the magnet 3 swings in a direction opposite to the direction shown by the arrow 30 and the direction of the lines of magnetic force passing through the pole pieces 15 and 17 and a yoke 23 is reversed thereby inducing a voltage of opposite polarity in the coils 24 and 26.

It will be understood from the description given with reference to FIGS. 3 and 4 that one embodiment of the pickup cartridge according to the present invention employs a pair of pole pieces in each channel and the front ends of these pole pieces are disposed opposite to each other. Thus, the size of the magnetic circuit can be reduced and yet two coils can be disposed in this magnetic circuit to obtain a large output voltage.

The pickup cartridge shown in FIGS. 3 and 4 is considerably large in size due to the fact that the pole pieces 17 and 18 protrude downward. Generally, an axial length of the order of 5 to 6 mm is required for the stylus arm in order that the stylus arm itself has a high resonance frequency. It is therefore necessary to minimize the downward protrusion of the pickup cartridge body so that the pickup cartridge body may not be in contact with a record during the play-back of recordings.

Figure 5:
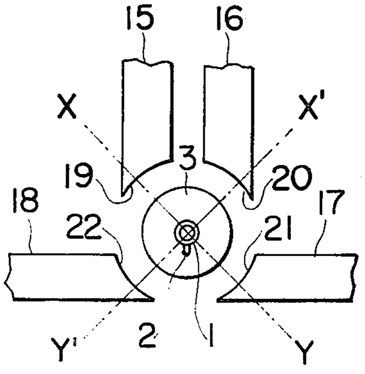
FIG. 5 is a schematic front elevation showing another form of the magnetic circuit arrangement in the pickup cartridge according to the present invention.
Figure 6:
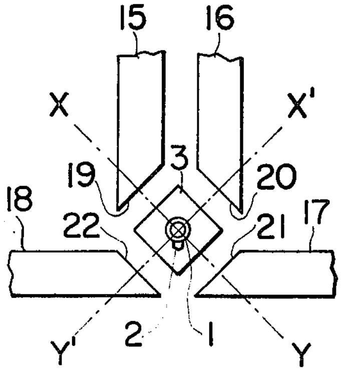
FIG. 6 is a schematic front elevation showing still another form of the magnetic circuit arrangement in the pickup cartridge according to the present invention.
Figure 7:
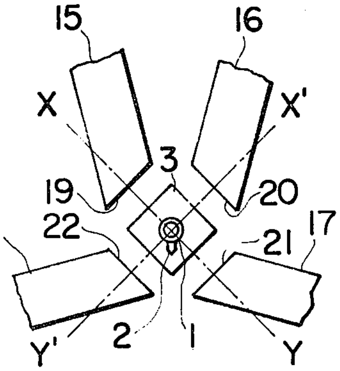
FIG. 7 is a schematic front elevation showing yet another form of the magnetic circuit arrangement in the pickup cartridge according to the present invention.

A few forms of such pickup cartridge are shown in FIGS. 5, 6 and 7. Referring to FIG. 5, two pole pieces 17 and 18 are disposed beneath a disc-shaped magnet 3 in a plane including this magnet 3. More precisely, these two pole pieces 17 and 18 are disposed in such a manner that their longitudinal axes extend horizontally in the plane including the magnet 3 so as to minimize the downward protrusion of the pole pieces 17 and 18 beneath the magnet 3. Further, the ends 19, 20, 21 and 22 of the respective pole pieces 15, 16, 17 and 18 opposite to the magnet 3 are arcuately shaped to conform to the outer peripheral surface contour of the disc-shaped magnet 3. The lines X-Y and X'-Y' in FIG. 5 show the directions of vibrations of the R-channel and L-channel respectively. The pole pieces 15 and 17 forming a first pair constitute one of the magnetic circuits, and the pole pieces 16 and 18 forming a second pair constitute the other magnetic circuit. The ends 19 and 21 of the respective pole pieces 15 and 17 forming the first pair are disposed symmetrically with respect to the line X'-Y', and the ends 20 and 22 of the respective poles pieces 16 and 18 forming the second pair are disposed symmetrically with respect to the line X-Y. Such an arrangement is advantageous in that the dimension of the cartridge body portion beneath the central axis of the magnet 3 can be minimized and the length of the stylus arm 1 can be reduced.

FIG. 6 shows a magnetic circuit arrangement in a pickup cartridge structure having a magnet 3 in the form of a square plate. In this arrangement too, pole pieces 17 and 18 are disposed horizontally in a plane including the magnet 3 so as to minimize downward protrusion of the pole pieces 17 and 18. Further, the ends 19, 20, 21 and 22 of respective pole pieces 15, 16, 17 and 18 opposite to the magnet 3 are straightly cut to conform to the configuration of the magnet 3.

A magnetic circuit arrangement shown in FIG. 7 is generally similar to that shown in FIG. 6, but it differs from the latter in that the spacing between a pole piece 15 for the R-channel and another pole piece 16 for the L-channel is gradually widened. Referring to FIG. 7, these two pole pieces 15 and 16 are disposed in inclined relation with respect to the vertical, and the remaining two pole pieces 17 and 18 are disposed in such a manner that the straight ends 19 and 21 of the pole pieces 15 and 17 are symmetrical with respect to the line X'-Y' and the straight ends 20 and 22 of the pole pieces 16 and 18 are symmetrical with respect to the line X-Y. Such an arrangement is advantageous in that crosstalk between the R-channel and L-channel can be minimized due to the fact that the spacing between the pole piece 15 for the R-channel and the pole piece 16 for the L-channel is gradually widened.

Figure 8:
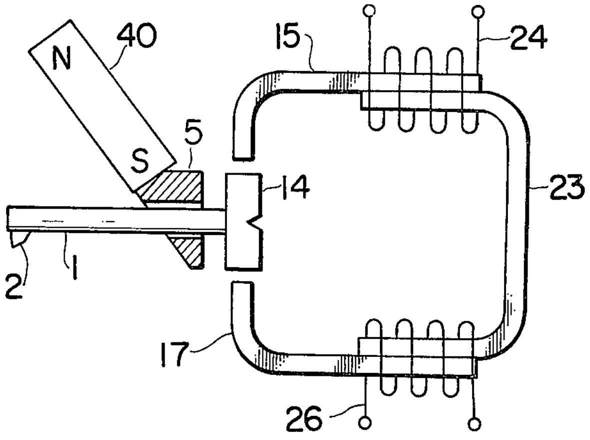
FIG. 8 is a schematic sectional view showing parts of another embodiment of the pickup cartridge according to the present invention.

The present invention is similarly applicable to a pickup cartridge of the kind in which a magnet is disposed externally and a magnetic flux is induced in an armature of soft magnetic material. An application of the present invention to such a pickup cartridge is illustrated in FIG. 8. Referring to FIG. 8, a stylus 2 and an armature 14 are mounted on opposite ends of a stylus arm 1. The armature 14 is made of a material having a high permeability. A pair of pole pieces 15 and 17 are coupled to each other by a yoke 23 and coils 24 and 26 are wound around the respective pole pieces 15 and 17. An external magnet 40 is disposed adjacent to a stopper 5 of magnetic material having a high permeability for magnetizing this stopper 5. According to this arrangement, the armature 14 is magnetized by the external magnet 40 and an output voltage can be induced in the coils 24 and 26 as in the arrangement shown in FIGS. 3 and 4 in which the magnet 3 is fixed to the stylus arm 1.

Figure 9:
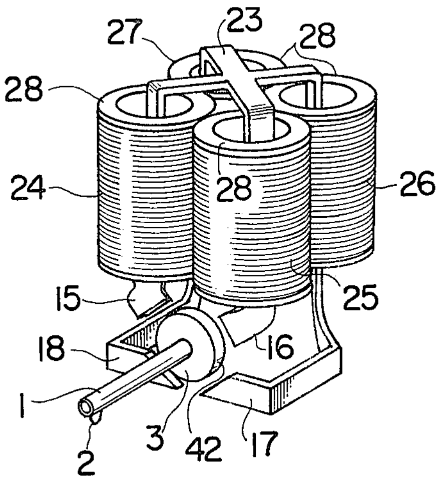
FIG. 9 is a perspective view showing the combination of one form of the vibration system and one form of the voltage generating system in the pickup cartridge according to the present invention.

FIG. 9 shows an assembly of an vibration system and a voltage generating system constituting a pickup cartridge embodying the present invention. Referring to FIG. 9, four pole pieces 15, 16, 17 and 18 are each provided with an end opposite to the outer peripheral surface 42 of a disc-shaped magnet 3. The above-mentioned ends of the pole pieces 15 and 17 forming a first pair are opposite to each other, and the above-mentioned ends of the pole pieces 16 and 18 forming a second pair are also opposite to each other. Further, the other end portions of the pole pieces 15, 16, 17 and 18 are bent upward to be coupled to a cross-shaped yoke 23. Coils 24, 25, 26 and 27 associated with the respective pole pieces 15, 16, 17 and 18 are wound around bobbins 28 mounted on the respective pole pieces 15, 16, 17 and 18. In the pickup cartridge shown in FIG. 9, the end portions of the pole pieces 15, 16, 17 and 18 remote from the magnet 3 are bent upward, the coils 24, 25, 26 and 27 are disposed above the magnet 3, and the end portions of the pole pieces 15, 16, 17 and 18 opposite to the magnet 3 are arranged as shown. Therefore, the cartridge body portion beneath the magnet 3 can be reduced in size thereby providing no hindrance to the playing of a record.

Figure 10:
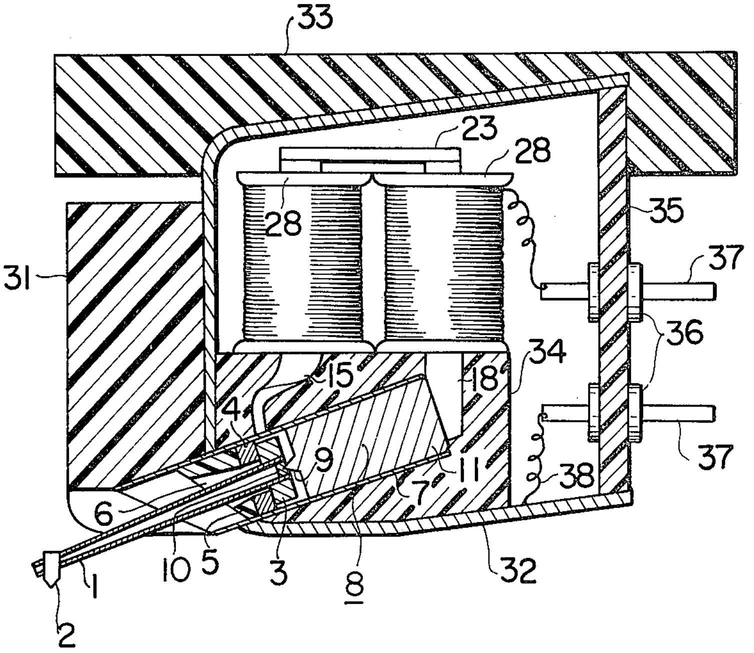
FIG. 10 is a sectional view showing the practical structure of the pickup cartridge according to the present invention.

FIG. 10 shows a pickup cartridge according to the present invention in which a magnetic circuit arrangement as shown in FIG. 9 is employed. Referring to FIG. 10, a stylus arm 1 is generally in the form of a tubular member of aluminum. A stylus 2 is fixed to the front end of the stylus arm 1 and is made of a material such as diamond or sapphire. A magnet 3 having a central axial opening is mounted in coaxial relation on the rear end of the stylus arm 1 to constitute an vibration system together with the stylus arm 1 and stylus 2. The magnet 3 is in the from of a flat plate and is herein in the form of, for example, a disc. A needle engaging member 10 forming a part of a pivot means 8 is firmly received in the rear end opening of the stylus arm 1 and is formed with a conical recess engaged by a sharp-pointed needle 9 of material such as stainless steel, sapphire or diamond. The conical recess has a spherical surface and the radius $R_1$ of this spherical surface is about 10 to 50 $\mu$. A sleeve 7 of thin plate of non-magnetic metal material surrounds the entire vibration system and has a shape such that it may not contact the surface of a record. A stopper 5 is fixedly mounted in the sleeve 7 and is provided with a tapered central axial opening 6 through which the stylus arm 1 extends. The stopper 5 is not in contact with the stylus arm 1 and is a non-elastic body of metal or plastic material acting as a stationary wall member so that it is always held stationary without making any vibrations. A columnar needle holder 11 is fixedly mounted in the sleeve 7 and the needle 9 is fixed to the front end of the needle holder 11. The radius $R_2$ of the spherical tip surface portion of the needle 9 is preferably of the order of 10 to 40 $\mu$. The needle holder 11 is made of a suitable non-elastic material such as brass or glass. A supporting member 4 of suitably soft elastic material such as synthetic or natural rubber is provided for the purpose of giving the vibration system the force of restitution and damping undesirable resonance of the vibration system. The supporting member 4 is formed with a central axial opening through which the stylus arm 1 extends, and is disposed between the magnet 3 forming a part of the oscillation system and the stopper 5 acting as the stationary wall member to be compressed by these members.

When the stylus 2 is such an vibration system traces the sound groove of a record, the vibration system vibrates around the point pivotally supported by the pivot means 8. Thus, the stiffness in the vertical direction can be increased compared with prior art cartridges in which rubber members are solely used for preventing vertical parallel vibrations, and occurrence of undesirable vertical parallel vibrations can be substantially eliminated as a matter of fact.

A knob 31 of, for example, molded plastic is secured to the sleeve 7 so that, when this knob 31 is pulled away from the cartridge body, the vibration system can be separated from the magnetic circuit system thereby facilitating the replacement of the stylus. When the knob 31 is forced into the cartridge body until it is engaged by a shielding casing 32, the outer peripheral surface of the magnet 3 should be brought to a position opposite to the lower ends of the pole pieces 15, 16, 17 and 18. The shielding casing 32 is made of a material such as permalloy. The shielding casing 32 is mounted to the cartridge shell by a mounting member 33 which is molded from a plastic material. A block 34 of resin material is provided for the purpose of accurate positioning of the pole pieces 15, 16, 17 and 18 and securing the sleeve 7 in position. A rear end cover 35 of material such as metal or synthetic resin closes the rear end opening of the shielding casing 32. Insulating rings 36 are mounted in the rear end cover 35 and terminals 37 are connected to the coils on the bobbins 28. The shielding casing 32 is grounded by a lead 38.

It will be understood from the foregoing description that a magnet in the form of a flat plate can be used in the pickup cartridge according to the present invention by virtue of the fact that each pair of pole pieces in two pole piece pairs have their ends disposed opposite to each other on opposite sides of the magnet. Further, due to the fact that each pair of pole pieces are disposed at positions of point symmetry with respect to the central axis of the magnet to constitute a magnetic circuit, a yoke of any suitable shape can be coupled to these pole pieces, two coils can be employed and yet a large output voltage can be obtained.

We claimed:

1. A magnetic pickup cartridge comprising a shielding casing made of magnetic material, a cylindrical sleeve made of non-magnetic material and inserted into said shielding casing, a stopper having an opening at a center thereof and mounted at an inner peripheral surface of said cylindrical sleeve at a first end of said cylindrical sleeve, a stylus arm having a stylus arm having a stylus mounted at a first end of said stylus arm, said stylus arm having a second end inserted into said opening of said stopper, a disc-shaped magnet mounted at said second end of said stylus arm in perpendicular relation to the axis of said stylus arm and magnetized in the same direction as the axial direction of said stylus arm, said disc-shaped magnet having an outer peripheral surface parallel to said axial direction of said stylus arm, a disc-shaped supporting member disposed between said stopper and said disc-shaped magnet, a needle engaging member secured to said second end of said stylus arm, said needle engaging member having a conical recess, needle means for engaging said conical recess of said needle engaging member, a needle holder for holding said needle, said needle holder being mounted on said inner peripheral surface of said cylindrical sleeve, a pair of magnetic circuits housed in said shielding casing, each of said magnetic circuits including two pole pieces, and a yoke connecting said two pole pieces, wherein each one of said two pole pieces of each of said magnetic circuits extends perpendicular to the axis of the stylus arm and includes an edge end surface disposed opposite to said outer peripheral surface of said disc-shaped magnet; one of said two pole pieces of each of said magnetic circuits being disposed beneath said magnet and arranged to extend substantially horizontally in a plane perpendicular to said stylus arm through said disc-shaped magnet; the other of said two pole pieces of each of said magnetic circuits being disposed above said magnet and arranged at a position symmetrical with the corresponding one of said two pole pieces with respect to the center point of said magnet and in parallel with the direction of vibration of said disc-shaped magnet with respect to the opposite one of the L-channel and R-channel; and each of said pole pieces of said pair of magnetic circuits being respectively wound with a coil.

2. A magnetic pickup cartridge comprising:

vibration means for producing vibrations in response to a sound recording, said vibration means including an elongated stylus arm having a predetermined dimension perpendicular to the direction of elongation, a stylus secured to a first end of said stylus arm, a magnet coaxially secured to a second end of said stylus arm, said magnet having outer peripheral edge surfaces parallel to the axial direction of said stylus arm, an elongated sleeve means having a stopper secured at a first end of said elongated sleeve means and having a pivot means secured at a second end of said elongated sleeve means, said second end of said stylus arm being arranged within said elongated sleeve such that said magnet is disposed between said stopper and said pivot means, said stopper having an opening larger than said predetermined dimension of said stylus arm, and a resilient supporting member having an opening larger than said predetermined dimension of said stylus arm, said supporting member being arranged within said elongated sleeve between said magnet and said stopper such that said magnet and said supporting member are held against said stopper by said pivot means, thereby enabling vibration of said stylus arm and magnet with respect to said pivot means free of extraneous oscillations in directions other than with respect to said pivot means; and a pair of magnetic circuit means magnetically coupled with said magnet for generating a voltage in response to said vibration of said stylus arm and magnet, each of said pair of magnetic circuit means includes two pole pieces and a yoke connecting said two pole pieces, each of said two pole pieces having a free end surface, said free end surface of each pole piece of each respective pair of magnetic circuit means being in facing relation through an air gap with the outer peripheral edge surface of said magnet, and said free end surface of each pole piece having a dimension in the axial direction of the stylus arm substantially the same as the axial dimension of the outer peripheral surface of said magnet.

3. A magnetic pickup cartridge according to claim 2, wherein said stylus arm is tubular and said elongated sleeve is cylindrical, said openings of said stopper and said supporting member being centrally axially disposed.

4. A magnetic pickup cartridge according to claim 3, wherein said stopper is formed of a solid material selected from the group consisting of a synthetic resin and metal.

5. A magnetic pickup cartridge according to claim 4, wherein said opening of said stopper is tapered with a smallest diameter being larger than the diameter of said tubular stylus arm.

6. A magnetic pickup cartridge according to claim 3, wherein said supporting member is an elastic material selected from the group consisting of synthetic or natural rubber.

7. A magnetic pickup cartridge according to claim 3, wherein said pivot means includes a pivot holder secured in said second end of said sleeve, a substantially conical needle secured to said pivot holder, and a needle engaging means secured to said second end of said stylus arm in facing relationship with said needle.

8. A magnetic pickup cartridge according to claim 7, wherein said needle engaging means is formed with a substantially conical recess in said facing relationship, and said needle engaging means being fixed within a tubular opeing of said stylus arm at said second end.

9. A magnetic pickup cartridge according to claim 8, wherein said conical recess has a spherical surface with a radius of from about 10 to 50 $\mu$.

10. A magnetic pickup cartridge according to claim 2, wherein said vibration means is removable from said magnetic circuit means.

11. A magnetic pickup cartridge according to claim 2, wherein said magnet is formed of one of a flat square-shaped plate and a flat circular disc.

12. A magnetic pickup cartridge according to claim 11, wherein said pair of magnetic circuit means is provided in magnetic coupling with said magnet for generating a voltage in response to at least one of an L-signal and an R-signal of said sound recording.

13. A magnetic pickup cartridge according to claim 12, wherein said end surfaces of said pole pieces of each of said respective pair of magnetic circuit means are disposed symmetrically with a central axis of said magnet.

14. A magnetic pickup cartridge according to claim 13, wherein said pair of magnetic circuit means is disposed perpendicularly with respect to one another.

15. A magnetic pickup cartridge according to claim 12, wherein said magnet is formed of a flat square-shaped plate having an outer peripheral edge surface formed of the four edges of said square-shape.

16. A magnetic pickup cartridge according to claim 15, wherein said end surfaces are parallel to said outer peripheral edge surfaces of said plate.

17. A magnetic pickup cartridge according to claim 16, wherein one pole piece of each of said two pole pieces of each magnetic circuit means extends substantially in a line with respect to one another, said line being offset from the center of said plate, while the other pole piece of each of said two pole pieces of each magnetic circuit means are in substantially side-by-side relationship with one another in respect to said plate magnet.

18. A magnetic pickup cartridge according to claim 16 wherein one pole piece of each of said two pole pieces of each said magnetic circuit means extends from said plate magnet at an obtuse angle with respect to one another, while the other pole piece of each of said two pole pieces of each magnetic circuit means extends from said plate magnet at an acute angle with respect to one another.

19. A magnetic pickup cartridge according to claim 12, wherein said magnet is formed of a flat circular disc.

20. A magnetic pickup cartridge according to claim 19, wherein said end faces are arcuate and parallel to said outer peripheral edge of said magnet.

21. A magnetic pickup cartridge according to claim 20, wherein one pole piece of each of said two pole pieces of each magnetic circuit means extends substantially in a line with respect to one another, said line being offset from the center of said disc magnet, while the other pole piece of each of said two pole pieces of each magnetic circuit means are in substantially side-by-side relationship with one another in respect to said disc magnet.

22. A pickup cartridge as claimed in claim 1, wherein said four pole pieces have an arcuate edge end, and said magnet disposed in said magnetic circuits is in the form of a disc.

* * * * *